(12) United States Patent
Zhang et al.

(10) Patent No.: US 11,906,429 B2
(45) Date of Patent: *Feb. 20, 2024

(54) TWO-PHOTON STIMULATED EMISSION DEPLETION COMPOSITE MICROSCOPE USING CONTINUOUS LIGHT LOSS

(71) Applicants: SUZHOU INSTITUTE OF BIOMEDICAL ENGINEERING AND TECHNOLOGY, CHINESE ACADEMY OF SCIENCES, Jiangsu (CN); SUZHOU GUOKE MEDICAL TECHNOLOGY DEVELOPMENT (GROUP) CO., LTD., Jiangsu (CN)

(72) Inventors: Yunhai Zhang, Suzhou (CN); Yuguo Tang, Suzhou (CN); Tongda Wei, Suzhou (CN); Jian Chang, Suzhou (CN); Haomin Yang, Suzhou (CN); Lin Ji, Suzhou (CN)

(73) Assignees: SUZHOU INSTITUTE OF BIOMEDICAL ENGINEERING AND TECHNOLOGY, CHINESE ACADEMY OF SCIENCES (CN); SUZHOU GUOKE MEDICAL TECHNOLOGY DEVELOPMENT (GROUP) CO., LTD. (CN)

(*) Notice: Subject to any disclaimer, the term of this patent is extended or adjusted under 35 U.S.C. 154(b) by 703 days.

This patent is subject to a terminal disclaimer.

(21) Appl. No.: 16/977,629

(22) PCT Filed: Nov. 27, 2018

(86) PCT No.: PCT/CN2018/117624
§ 371 (c)(1),
(2) Date: Sep. 2, 2020

(87) PCT Pub. No.: WO2020/048022
PCT Pub. Date: Mar. 12, 2020

(65) Prior Publication Data
US 2021/0041363 A1    Feb. 11, 2021

(30) Foreign Application Priority Data
Sep. 7, 2018  (CN) .......................... 201811040644.8

(51) Int. Cl.
G02B 21/00    (2006.01)
G01N 21/64    (2006.01)
G02B 21/08    (2006.01)

(52) U.S. Cl.
CPC ..... *G01N 21/6458* (2013.01); *G02B 21/0032* (2013.01); *G02B 21/0072* (2013.01); *G02B 21/0076* (2013.01); *G02B 21/082* (2013.01)

(58) Field of Classification Search
CPC ........... G01N 21/6458; G02B 21/0032; G02B 21/0072; G02B 21/0076; G02B 21/082;
(Continued)

(56) References Cited

U.S. PATENT DOCUMENTS 6,020,591 A * 2/2000 Harter ................ G02B 21/0084
250/459.1
9,575,302 B2 * 2/2017 Booth ................ G02B 21/0072
(Continued)

FOREIGN PATENT DOCUMENTS

| CN | 101821607 A | 9/2010 |
| CN | 103676123 A | * 3/2014 |

(Continued)

OTHER PUBLICATIONS

English translation of Office Action issued in Chinese Application No. 201811040644.8.
English translation of Written Opinion of International Application No. PCT/CN2018/117624.

*Primary Examiner* — Mustak Choudhury
(74) *Attorney, Agent, or Firm* — DINSMORE & SHOHL LLP

(57) ABSTRACT

A two-photon stimulated emission depletion composite microscope using continuous light loss, the microscope comprising: a two-photon imaging unit (100) and an STED imaging unit (200), wherein for thicker samples, the two-photon imaging unit (100) can be used, and for regions of (Continued)

interest on the surface of samples, the STED super-resolution imaging unit (200) can be used. The two-photon stimulated emission depletion composite microscope using continuous light loss integrates two functions of STED imaging and two-photon imaging, so as to provide a powerful tool for cutting-edge biomedical research.

10 Claims, 2 Drawing Sheets

(58) Field of Classification Search
CPC ........ G02B 21/00; G02B 21/06; G02B 21/08; G01Q 60/22; G01Q 30/025; G01Q 60/20; G01Q 30/02; G01Q 20/02; G01Q 10/00; G01Q 60/24; G01Q 60/38; G01Q 60/42; G01Q 30/14; G01Q 10/045; G21K 1/006; G21K 1/00; G21K 7/00; G21K 1/003; G21K 5/04; G21K 1/093
See application file for complete search history.

(56) References Cited

U.S. PATENT DOCUMENTS

| | | | |
|---|---|---|---|
| 2008/0007735 A1* | 1/2008 | Hell | G01N 21/643 |
| | | | 356/601 |
| 2008/0018891 A1* | 1/2008 | Hell | G01N 21/6458 |
| | | | 356/317 |
| 2010/0176307 A1* | 7/2010 | Hell | G01N 21/636 |
| | | | 250/459.1 |
| 2018/0246308 A1* | 8/2018 | Shi | G02B 21/0072 |
| 2018/0267284 A1* | 9/2018 | Ben-Yakar | H01S 3/101 |
| 2019/0380585 A1* | 12/2019 | Chen | G02B 21/0048 |

FOREIGN PATENT DOCUMENTS

| | | |
|---|---|---|
| CN | 103676123 A | 3/2014 |
| CN | 103852877 A | 6/2014 |
| CN | 107045187 A | 8/2017 |

* cited by examiner

TWO-PHOTON STIMULATED EMISSION DEPLETION COMPOSITE MICROSCOPE USING CONTINUOUS LIGHT LOSS

CROSS-REFERENCE TO RELATED APPLICATIONS

This application is a US National Stage entry of International Application No. PCT/CN2018/117624, filed Nov. 27, 2018, published in Chinese. This application also claims priority to Chinese Patent Application No. 201811040644.8 filed with CNIPA on Sep. 7, 2018, the entirety of which is incorporated herein by reference.

TECHNICAL FIELD

The present invention relates to the technical field of microscopic optical imaging, and in particular relates to a two-photon stimulated emission depletion composite microscope using continuous light loss.

BACKGROUND

The imaging resolution of optical super-resolution microscopy has exceeded the limit derived from optical diffraction, and the imaging resolution thereof is much higher than that of traditional optical microscopes, which has been a research hotspot in recent years and various types of optical super-resolution microscopes have emerged. The stimulated emission depletion (STED) microscopy is the first far-field optical microscopy that breaks through the optical diffraction limit directly, which is based on the laser confocal microscopy imaging. As compared to other types of super-resolution microscopy, the stimulated emission depletion microscopy has relatively fast imaging speed, and can be used in live cell imaging, and can detect finer structures in biomedical research.

The STED imaging has very high degree of resolution, but has shallow imaging depth. The two-photon microscopic imaging has poor degree of resolution but has deep imaging depth due to the use of a near-infrared light. However, there has been no technical report of a composite microscope integrating both functions of STED imaging and two-photon imaging wherein, for thicker samples, the two-photon imaging can be used, and for regions of interest on the surface of samples, the STED super-resolution imaging can be used.

SUMMARY

In view of the defects in the prior art, it is needed to provide a two-photon stimulated emission depletion composite microscope using continuous light loss that can achieve rapid and high-precision beam combination of excitation light spot and depletion light spot.

To achieve the above objective, the present invention adopts the following technical solutions:

A two-photon stimulated emission depletion composite microscope using continuous light loss, comprising a two-photon imaging unit and an STED imaging unit, the two-photon imaging unit comprises a femtosecond laser emitter, a first reflector, a second reflector, a beam expander composed of a first lens and a second lens, a third reflector, a first dichroic mirror, a λ/4 wafer, a fourth reflector, an XY scanning mirror, a scanning lens, a tube lens, a second dichroic mirror, an objective lens, a three-dimensional nano-positioning platform for placing a sample thereon, an optical filter, a fifth reflector, a third lens, and a photomultiplier tube; wherein femtosecond laser emitted by the femtosecond laser emitter is reflected by the first reflector and the second reflector and enters the beam expander composed of the first lens and the second lens to form a light beam, and the light beam exits from the second lens and is reflected by the third reflector to enter the first dichroic mirror and is transmitted through the first dichroic mirror to enter the λ/4 wafer, and then the light beam is reflected by the fourth reflector to enter the XY scanning mirror, and the light beam exiting from the XY scanning mirror sequentially passes through the scanning lens and the tube lens to enter the second dichroic mirror, and the light beam transmitted through the second dichroic mirror enters the objective lens and is focused by the objective lens onto a sample placed on the three-dimensional nano-positioning platform; and fluorescence emitted by the sample is collected by the objective lens and then enters the second dichroic mirror, and after being reflected by the second dichroic mirror, the fluorescence enters the optical filter, and the optical filter is configured to suppress an incident laser and transmit the fluorescence, and the fluorescence transmitted through the optical filter is reflected by the fifth reflector and then enters the third lens, and the fluorescence is focused by the third lens to enter the photomultiplier tube which is configured to detect a two-photon imaging fluorescence signal; and the STED imaging unit comprises the femtosecond laser emitter, the first reflector, the second reflector, the beam expander composed of the first lens and the second lens, the third reflector, a continuous laser emitter, a sixth reflector, a seventh reflector, an eighth reflector, a phase plate, the first dichroic mirror, the λ/4 wafer, the fourth reflector, the XY scanning mirror, the scanning lens, the tube lens, the second dichroic mirror, the objective lens, the three-dimensional nano-positioning platform for placing a sample thereon, the optical filter, the fifth reflector, a fourth lens, a pinhole, and an avalanche photodiode, the fifth reflector being removable from an original optical path where it is initially located, wherein femtosecond laser emitted by the femtosecond laser emitter is reflected by the first reflector and the second reflector and enters the beam expander composed of the first lens and the second lens, and a light beam exiting from the second lens is reflected by the third reflector to enter the first dichroic mirror, and then the light beam is transmitted through the first dichroic mirror to form an excitation light; and laser emitted by the continuous laser emitter enters the eighth reflector after being reflected by the sixth reflector and the seventh reflector, and then enters the phase plate after being reflected by the eighth reflector, and a light beam transmitted through the phase plate is reflected by the first dichroic mirror to form a depletion light, and the excitation light and the depletion light are combined by the first dichroic mirror, and the combined beam enters the λ/4 wafer for polarization state adjustment, and is then reflected by the fourth reflector to enter the XY scanning mirror, and the light beam exiting from the XY scanning mirror sequentially passes through the scanning lens and the tube lens TL to enter the second dichroic mirror, and the light beam transmitted through the second dichroic mirror enters the objective lens and then is focused by the objective lens onto a sample placed on the three-dimensional nano-positioning platform, and fluorescence emitted by the sample is collected by the objective lens and then enters the second dichroic mirror, and after being reflected by the second dichroic mirror, the fluorescence enters the optical filter, the optical filter is configured to suppress an incident laser and transmit the fluorescence, and with the fifth reflector removed from the original optical path where the fifth reflector is initially located, the fluorescence transmitted through the optical filter directly enters the fourth lens and is focused to the pinhole located at a focus of the fourth lens, and the light beam exiting from the pinhole enters the avalanche photodiode which is configured to detect an STED imaging fluorescence signal.

In some preferred embodiments, the first reflector, the second reflector, the third reflector, the fourth reflector, the fifth reflector, the sixth reflector, and the seventh reflector are angle-adjustable around an X axis and a Y axis.

In some preferred embodiments, a light beam emitted by the femtosecond laser emitter can be quickly directed into the composite microscope by adjusting the angles of the first reflector and the second reflector around the X axis and the Y axis.

In some preferred embodiments, a light beam emitted by the continuous laser emitter can be quickly directed into the composite microscope by adjusting the angles of the sixth reflector and the seventh reflector around the X axis and the Y axis.

In some preferred embodiments, a position of an excitation light spot in an X direction or a Y direction can be adjusted by adjusting the angle of the third reflector around the X axis or the Y axis, and a position of the excitation light spot in a direction of an optical axis Z can be adjusted by adjusting the position of the second lens along the optical axis Z, such that the excitation light spot and a depletion light spot accurately coincide.

In some preferred embodiments, the position of the second lens is adjustable along an optical axis Z. In some preferred embodiments, a phase distribution of the phase plate has a spiral distribution of 0-2π.

In some preferred embodiments, during the detection of a two-photon imaging fluorescence signal, the XY scanning mirror moves and scans the light beam, and the three-dimensional nano-positioning platform remains stationary.

In some preferred embodiments, during the detection of an STED imaging fluorescence signal, the XY scanning mirror stays at a zero position when performing scanning, and the three-dimensional nano-positioning platform is moved such that the sample is moved and scanned for imaging.

In some preferred embodiments, the femtosecond laser emitter and the continuous laser emitter are detachably mounted on the two-photon stimulated emission depletion composite microscope using continuous light loss.

The above technical solutions adopted by the present invention have the following advantages: The present invention provides a two-photon stimulated emission depletion composite microscope using continuous light loss, the microscope comprises a two-photon imaging unit and an STED imaging unit, wherein, for thicker samples, the two-photon imaging unit can be used, and for regions of interest on the surface of samples, the STED super-resolution imaging unit can be used. The two-photon stimulated emission depletion composite microscope using continuous light loss integrates two functions of STED imaging and two-photon imaging, so as to provide a powerful tool for cutting-edge biomedical research.

BRIEF DESCRIPTION OF THE DRAWINGS

In order to more clearly describe the technical solutions in the specific embodiments of the present invention or in the prior art, the appended drawings used in the description of the specific embodiments or the prior art will be briefly introduced hereinafter. Apparently, the appended drawings described below represents some embodiments of the present invention, and other drawings can be obtained on the basis of these appended drawings by a person skilled in the art without making creative efforts.

DETAILED DESCRIPTION

The technical solutions in the embodiments of the present invention will be described clearly and completely with reference to the appended drawings in the embodiments of the present invention. Apparently, the described embodiments only represent part of but not all of the embodiments of the present invention. Based on the embodiments of the present invention, all other embodiments obtained by a person skilled in the art without making creative efforts fall within the protection scope of the present invention.

Figure 1:
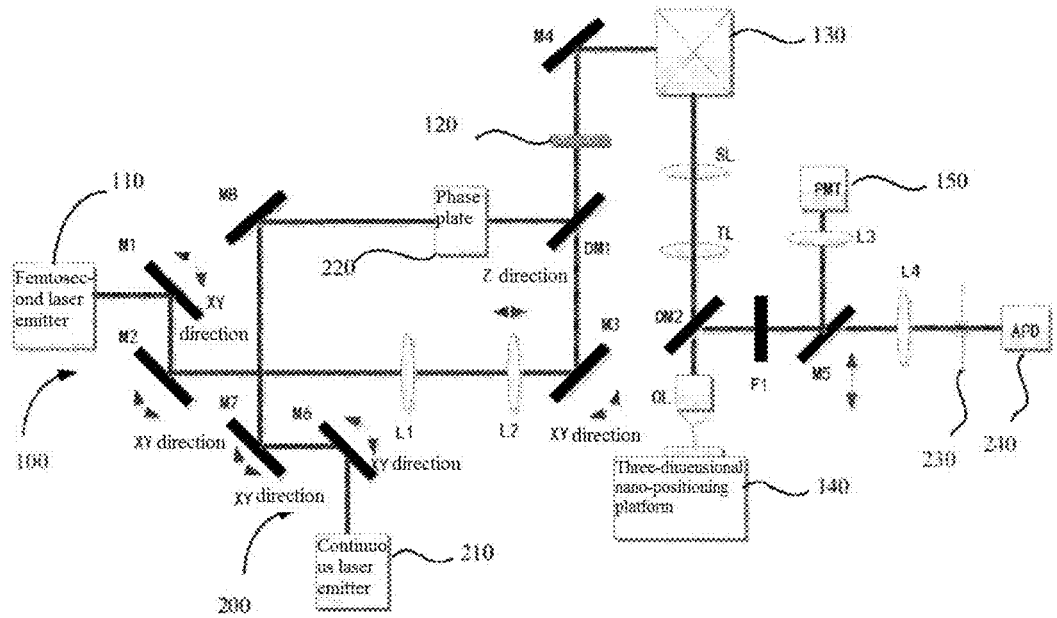
FIG. 1 is a schematic structural view of a two-photon stimulated emission depletion composite microscope using continuous light loss according to an embodiment of the present invention.

As shown in FIG. 1, which is a schematic structural view of a two-photon stimulated emission depletion composite microscope 10 using continuous light loss according to an embodiment of the present invention, and the microscope 10 includes a two-photon imaging unit 100 and an STED imaging unit 200.

The two-photon imaging unit 100 includes a femtosecond laser emitter 110, a first reflector M1, a second reflector M2, a beam expander composed of a first lens L1 and a second lens L2, a third reflector M3, a first dichroic mirror DM1, a λ/4 wafer 120, a fourth reflector M4, an XY scanning mirror 130, a scanning lens SL, a tube lens TL, a second dichroic mirror DM2, an objective lens OL, a three-dimensional nano-positioning platform 140 for placing the sample thereon, an optical filter F1, a fifth reflector M5, a third lens L3, and a photomultiplier tube 150.

The two-photon imaging unit 100 in an embodiment of the present invention works in the following way:

The femtosecond laser emitted by the femtosecond laser emitter 110 is reflected by the first reflector M1 and the second reflector M2 and enters the beam expander composed of the first lens L1 and the second lens L2 to form a light beam, and the light beam exits from the second lens L2 and is reflected by the third reflector M3 to enter the first dichroic mirror DM1 and is transmitted through the first dichroic mirror DM1 to enter the λ/4 wafer 120, and then the light beam is reflected by the fourth reflector M4 to enter the XY scanning mirror 130, and the light beam exiting from the XY scanning mirror 130 sequentially passes through the scanning lens SL and the tube lens TL to enter the second dichroic mirror DM2, and the light beam transmitted through the second dichroic mirror DM2 enters the objective lens OL and is focused by the objective lens OL onto a sample placed on the three-dimensional nano-positioning platform 140, and the fluorescence emitted by the sample is collected by the objective lens OL and then enters the second dichroic mirror DM2, and after being reflected by the second dichroic mirror DM2, the fluorescence enters the optical filter F1, and the optical filter F1 is configured to suppress an incident laser and transmit the fluorescence, and the fluorescence transmitted through the optical filter F1 is reflected by the fifth reflector M5 and then enters the third lens L3, and the fluorescence is focused by the third lens L3 to enter the photomultiplier tube (PMT) 150 which is configured to detect a two-photon imaging fluorescence signal.

It can be understood that, during the detection of a two-photon imaging fluorescence signal, the XY scanning mirror moves and scans the light beam, and the three-dimensional nano-positioning platform remains stationary.

The STED imaging unit 200 comprises the femtosecond laser 110, the first reflector M1, the second reflector M2, the beam expander composed of the first lens L1 and the second lens L2, the third reflector M3, a continuous laser emitter 210, a sixth reflector M6, a seventh reflector M7, an eighth reflector M8, a phase plate 220, the first dichroic mirror DM1, the λ/4 wafer 120, the fourth reflector M4, the XY scanning mirror 130, the scanning lens SL, the tube lens TL, the second dichroic mirror DM2, the objective lens OL, the three-dimensional nano-positioning platform 140 for placing a sample thereon, the optical filter F1, the fifth reflector M5, a fourth lens L4, a pinhole 230, and an avalanche photodiode 240, the fifth reflector M5 being removable from an original optical path where it is initially located.

The STED imaging unit 200 in an embodiment of the present invention works in the following way:

The femtosecond laser emitted by the femtosecond laser emitter is reflected by the first reflector M1 and the second reflector M2 and enters the beam expander composed of the first lens L1 and the second lens L2, and a light beam exiting from the second lens L2 is reflected by the third reflector M3 to enter the first dichroic mirror DM1, and then the light beam is transmitted through the first dichroic mirror DM1 to form an excitation light;

The laser emitted by the continuous laser emitter 210 enters the eighth reflector M8 after being reflected by the sixth reflector M6 and the seventh reflector M7, and then enters the phase plate 220 after being reflected by the eighth reflector M8, and a light beam transmitted through the phase plate 220 is reflected by the first dichroic reflector DM1 to form a depletion light, and the excitation light and the depletion light are combined by the first dichroic mirror DM1, and the combined light beam enters the λ/4 wafer for polarization state adjustment, and is then reflected by the fourth reflector M4 to enter the XY scanning mirror 130, and the light beam exiting from the XY scanning mirror 130 sequentially passes through the scanning lens SL and the tube lens TL to enter the second dichroic mirror DM2, and the light beam transmitted through the second dichroic mirror DM2 enters the objective lens OL and then is focused by the objective lens onto a sample placed on the three-dimensional nano-positioning platform 140, and the fluorescence emitted by the sample is collected by the objective lens OL and then enters the second dichroic mirror DM2, and after being reflected by the second dichroic reflector DM2, the fluorescence enters the optical filter F1, and the optical filter F1 is configured to suppress an incident laser and transmit fluorescence, and with the fifth reflector M5 removed from the original optical path where the fifth reflector is initially located, the fluorescence transmitted through the optical filter F1 directly enters the fourth lens L4 and is focused to the pinhole 230 at a focal of the fourth lens L4, and the light beam exiting from the pinhole 230 enters the avalanche photodiode 240 (APD) which is configured to detect an STED imaging fluorescence signal.

It can be understood that, during the detection of an STED imaging fluorescence signal, the XY scanning mirror stays at a zero position when performing scanning, and the three-dimensional nano-positioning platform is moved such that the sample is moved and scanned for imaging.

In some preferred embodiments, a laser can be accurately input into the microscope system by adjusting the angles of the first reflector, the second reflector, the third reflector, the fourth reflector, the fifth reflector, the sixth reflector and the seventh reflector around an X axis and a Y axis.

Specifically, for the light beam emitted by the femtosecond laser emitter 110 and propagating in free space, two reflectors comprising the first reflector M1 and the second reflector M2 with angles adjustable around the X axis and the Y axis are used, and the light beam emitted by the femtosecond laser emitter can be quickly directed into the microscope system by adjusting M1 and M2; for the light beam emitted by the continuous laser emitter 210 and propagating in free space, two reflectors comprising the sixth reflector M6 and the seventh reflector M7 with angles adjustable around the X axis and the Y axis are used, and the light beam emitted by the continuous laser emitter can be quickly directed into the microscope system by adjusting M6 and M7.

In some preferred embodiments, a phase distribution of the phase plate has a spiral distribution of 0-2π.

In some preferred embodiments, the femtosecond laser emitter and the continuous laser emitter are detachably mounted on the two-photon stimulated emission depletion composite microscope using continuous light loss.

It can be understood that, the femtosecond laser emitter and the continuous light laser emitter used in the two-photon stimulated emission depletion composite microscope using continuous light loss provided by the present invention are relatively large in size, and these laser emitters need to be demounted from the microscope when the microscope is transported or moved. In order to enable the femtosecond laser emitter and the continuous light laser emitter to be quickly and accurately connected to the microscope system, the femtosecond laser emitter and the continuous laser emitter are detachably mounted on the two-photon stimulated emission depletion composite microscope using continuous light loss for convenient disassembly and transportation.

Figure 2:
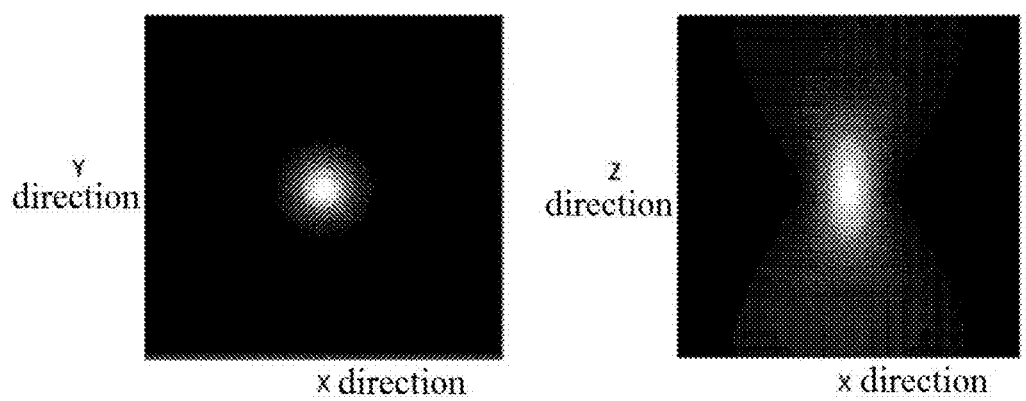
FIG. 2 shows the light intensity distribution of the excitation light spot at the focus of the objective lens in a two-photon stimulated emission depletion composite microscope using continuous light loss provided by the present invention.

FIG. 2 shows the light intensity distribution of the excitation light spot at the focus of the objective lens (light intensity distribution in an X-Y plane and an X-Z plane) in the two-photon stimulated emission depletion composite microscope using continuous light loss provided by the present invention, wherein, after passing through the objective lens, the excitation light is focused to be a solid three-dimensional light spot having a long oval shape.

Figure 3:
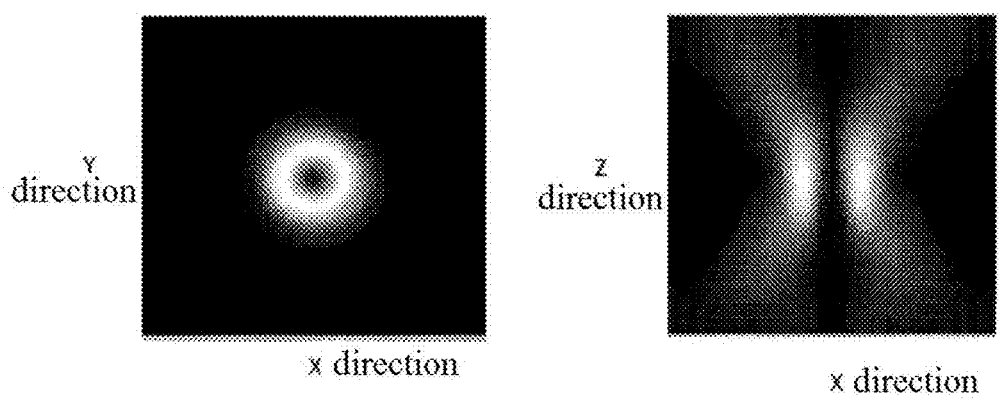
FIG. 3 shows the light intensity distribution of the depletion light spot at the focus of the objective lens of the two-photon stimulated emission depletion composite microscope using continuous light loss provided by the present invention.

FIG. 3 shows the light intensity distribution of the depletion light spot at the focus of the objective lens (light intensity distribution in an X-Y plane and an X-Z plane) in the two-photon stimulated emission depletion composite microscope using continuous light loss provided by the present invention, wherein, after passing through the objective lens, the depletion light is focused to be a hollow three-dimensional light spot having a cylindrical shape.

It can be understood that, STED imaging requires the excitation light spot and the depletion light spot to coincide accurately in three-dimensional directions. The position of the depletion light spot is used as a reference (staying stationary), and the three-dimensional position of the excitation light spot is adjusted to accurately coincide with the excitation light spot, wherein the angle of the third reflector M3 around the X axis or the Y axis is adjusted to change the position of the excitation light spot in the X or Y direction, and the position of the second lens L2 along the optical axis Z is adjusted to change the position of the excitation light spot in the Z direction, therefore, the excitation light spot and the loss light spot can be made to accurately coincide with each other.

In the two-photon stimulated emission depletion composite microscope using continuous light loss provided by the present invention, for thicker samples, the two-photon imaging unit can be used, and for regions of interest on the surface of samples, the STED super-resolution imaging unit can be used. The two-photon stimulated emission depletion composite microscope using continuous light loss provided by the present invention integrates two functions of STED imaging and two-photon imaging, so as to provide a powerful tool for cutting-edge biomedical research.

Certainly, the two-photon stimulated emission depletion composite microscope using continuous light loss of the present invention can also have various variations and modifications, and is not limited to the specific structures in the above embodiments. In summary, the protection scope of the present invention shall include those variations, substitutions and modifications that are obvious to a person skilled in the art.

What is claimed is:

1. A two-photon stimulated emission depletion composite microscope using continuous light loss, comprising a two-photon imaging unit and a stimulated emission depletion (STED) imaging unit, the two-photon imaging unit comprises a femtosecond laser emitter, a first reflector, a second reflector, a beam expander composed of a first lens and a second lens, a third reflector, a first dichroic mirror, a λ/4 wafer, a fourth reflector, an XY scanning mirror, a scanning lens, a tube lens, a second dichroic mirror, an objective lens, a three-dimensional nano-positioning platform for placing a sample thereon, an optical filter, a fifth reflector, a third lens, and a photomultiplier tube; wherein femtosecond laser emitted by the femtosecond laser emitter is reflected by the first reflector and the second reflector and enters the beam expander composed of the first lens and the second lens to form a light beam, and the light beam exits from the second lens and is reflected by the third reflector to enter the first dichroic mirror and is transmitted through the first dichroic mirror to enter the λ/4 wafer, and then the light beam is reflected by the fourth reflector to enter the XY scanning mirror, and the light beam exiting from the XY scanning mirror sequentially passes through the scanning lens and the tube lens to enter the second dichroic mirror, and the light beam transmitted through the second dichroic mirror enters the objective lens and is focused by the objective lens onto a sample placed on the three-dimensional nano-positioning platform; and fluorescence emitted by the sample is collected by the objective lens and then enters the second dichroic mirror, and after being reflected by the second dichroic mirror, the fluorescence enters the optical filter, and the optical filter is configured to suppress an incident laser and transmit the fluorescence, and the fluorescence transmitted through the optical filter is reflected by the fifth reflector and then enters the third lens, and the fluorescence is focused by the third lens to enter the photomultiplier tube which is configured to detect a two-photon imaging fluorescence signal; and the STED imaging unit comprises the femtosecond laser emitter, the first reflector, the second reflector, the beam expander composed of the first lens and the second lens, the third reflector, a continuous laser emitter, a sixth reflector, a seventh reflector, an eighth reflector, a phase plate, the first dichroic mirror, the λ/4 wafer, the fourth reflector, the XY scanning mirror, the scanning lens, the tube lens, the second dichroic mirror, the objective lens, the three-dimensional nano-positioning platform for placing a sample thereon, the optical filter, the fifth reflector, a fourth lens, a pinhole, and an avalanche photodiode, the fifth reflector being removable from an original optical path where it is initially located, wherein femtosecond laser emitted by the femtosecond laser emitter is reflected by the first reflector and the second reflector and enters the beam expander composed of the first lens and the second lens, and a light beam exiting from the second lens is reflected by the third reflector to enter the first dichroic mirror, and then the light beam is transmitted through the first dichroic mirror to form an excitation light; and laser emitted by the continuous laser emitter enters the eighth reflector after being reflected by the sixth reflector and the seventh reflector, and then enters the phase plate after being reflected by the eighth reflector, and a light beam transmitted through the phase plate is reflected by the first dichroic mirror to form a depletion light, and the excitation light and the depletion light are combined by the first dichroic mirror, and the combined beam enters the λ/4 wafer for polarization state adjustment, and is then reflected by the fourth reflector to enter the XY scanning mirror, and the light beam exiting from the XY scanning mirror sequentially passes through the scanning lens and the tube lens TL to enter the second dichroic mirror, and the light beam transmitted through the second dichroic mirror enters the objective lens and then is focused by the objective lens onto a sample placed on the three-dimensional nano-positioning platform, and fluorescence emitted by the sample is collected by the objective lens and then enters the second dichroic mirror, and after being reflected by the second dichroic mirror, the fluorescence enters the optical filter, the optical filter is configured to suppress an incident laser and transmit the fluorescence, and with the fifth reflector removed from the original optical path where the fifth reflector is initially located, the fluorescence transmitted through the optical filter directly enters the fourth lens and is focused to the pinhole located at a focus of the fourth lens, and the light beam exiting from the pinhole enters the avalanche photodiode which is configured to detect an STED imaging fluorescence signal.

2. The two-photon stimulated emission depletion composite microscope using continuous light loss according to claim 1, wherein
the first reflector, the second reflector, the third reflector, the fourth reflector, the fifth reflector, the sixth reflector, and the seventh reflector are angle-adjustable around an X axis and a Y axis.

3. The two-photon stimulated emission depletion composite microscope using continuous light loss according to claim 2, wherein
a light beam emitted by the femtosecond laser emitter can be quickly directed into the composite microscope by adjusting the angles of the first reflector and the second reflector around the X axis and the Y axis.

4. The two-photon stimulated emission depletion composite microscope using continuous light loss according to claim 2, wherein
a light beam emitted by the continuous laser emitter can be quickly directed into the composite microscope by adjusting the angles of the sixth reflector and the seventh reflector around the X axis and the Y axis.

5. The two-photon stimulated emission depletion composite microscope using continuous light loss according to claim 2, wherein
the position of the second lens is adjustable along an optical axis Z.

6. The two-photon stimulated emission depletion composite microscope using continuous light loss according to claim 5, wherein
a position of an excitation light spot in an X direction or a Y direction can be adjusted by adjusting the angle of the third reflector around the X axis or the Y axis, and a position of the excitation light spot in a direction of the optical axis Z can be adjusted by adjusting the position of the second lens along the optical axis Z, such that the excitation light spot and a depletion light spot accurately coincide.

7. The two-photon stimulated emission depletion composite microscope using continuous light loss according to claim 1, wherein
a phase distribution of the phase plate has a spiral distribution of $0$-$2\pi$.

8. The two-photon stimulated emission depletion composite microscope using continuous light loss according to claim 1, wherein
during the detection of a two-photon imaging fluorescence signal, the XY scanning mirror moves and scans the light beam, and the three-dimensional nano-positioning platform remains stationary.

9. The two-photon stimulated emission depletion composite microscope using continuous light loss according to claim 1, wherein
during the detection of an STED imaging fluorescence signal, the XY scanning mirror stays at a zero position when performing scanning, and the three-dimensional nano-positioning platform is moved such that the sample is moved and scanned for imaging.

10. The two-photon stimulated emission depletion composite microscope using continuous light loss according to claim 1, wherein
the femtosecond laser emitter and the continuous laser emitter are detachably mounted on the two-photon stimulated emission depletion composite microscope using continuous light loss.

* * * * *